(12) United States Patent
Telfus

(10) Patent No.: US 8,223,522 B2
(45) Date of Patent: Jul. 17, 2012

(54) BI-DIRECTIONAL REGULATOR FOR REGULATING POWER

(75) Inventor: Mark D. Telfus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 435 days.

(21) Appl. No.: 11/904,180

(22) Filed: Sep. 25, 2007

(65) Prior Publication Data
US 2008/0074095 A1 Mar. 27, 2008

Related U.S. Application Data

(60) Provisional application No. 60/847,350, filed on Sep. 25, 2006.

(51) Int. Cl.
H02M 7/155 (2006.01)
H02M 7/162 (2006.01)
H02M 7/17 (2006.01)

(52) U.S. Cl. ............ 363/125; 363/79; 363/89

(58) Field of Classification Search ......... 363/15, 363/63, 65, 74, 78, 79, 80, 125, 89; 323/266
See application file for complete search history.

(56) References Cited

U.S. PATENT DOCUMENTS

| | | | |
|---|---|---|---|
| 4,051,425 A | 9/1977 | Smith | 363/86 |
| 4,273,406 A | 6/1981 | Okagami | |
| 4,490,690 A | 12/1984 | Suzuki | |
| 4,642,588 A | 2/1987 | Kameya | |
| 4,686,495 A | 8/1987 | Kameya | |
| 4,695,812 A | 9/1987 | Kameya | |
| 4,695,933 A | 9/1987 | Nguyen et al. | |
| 4,712,160 A | 12/1987 | Sato et al. | 361/388 |
| 4,788,626 A | 11/1988 | Neidig et al. | 361/386 |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | 363/26 |
| 4,899,256 A | 2/1990 | Sway-Tin | 361/386 |
| 4,975,821 A | 12/1990 | Lethellier | |
| 5,038,264 A | 8/1991 | Steigerwald | |
| 5,101,322 A | 3/1992 | Ghaem et al. | 361/386 |

(Continued)

OTHER PUBLICATIONS

"New Architectures for Radio-Frequency dc/dc Power Conversion", Juan Rivas et al., Laboratory for Electromagnetic and Electronic Systems, Massachusetts Institut eof Technology, Room 10-171 Cambridge, MA 02139, pp. 4074-4084.

(Continued)

*Primary Examiner* — Jeffrey Sterrett
*Assistant Examiner* — Nusrat Quddus
(74) *Attorney, Agent, or Firm* — Haverstock & Owens LLP

(57) ABSTRACT

A regulated power supply apparatus is provided. The apparatus includes an input power converting circuit for generating a rectified voltage signal, an output power converting circuit comprising a plurality of switching elements, the output power converting circuit coupled to receive the rectified voltage signal, an output power storing element coupled with the output power converting circuit, and an output power bidirectional regulating circuit comprising an integrated circuit coupled with the output power converting circuit, the bidirectional regulating circuit including control signals for operating the switching elements to store power on the output power storing element and to deliver power to an output load from the output power storing element. An integrated circuit controlled regulator circuit is provided for controlling a plurality of switches a boost and buck converter. A method of regulating power supply is also provided.

24 Claims, 6 Drawing Sheets

U.S. PATENT DOCUMENTS

| | | | | |
|---|---|---|---|---|
| 5,164,657 | A | 11/1992 | Gulczynski | 323/275 |
| 5,235,491 | A | 8/1993 | Weiss | 361/694 |
| 5,262,932 | A | 11/1993 | Stanley et al. | 363/26 |
| 5,295,044 | A | 3/1994 | Araki et al. | 361/709 |
| 5,438,294 | A | 8/1995 | Smith | |
| 5,490,052 | A | 2/1996 | Yoshida et al. | |
| 5,565,761 | A | 10/1996 | Hwang | 323/222 |
| 5,565,781 | A | 10/1996 | Dauge | 324/403 |
| 5,592,128 | A | 1/1997 | Hwang | 331/61 |
| 5,673,185 | A | 9/1997 | Albach et al. | |
| 5,712,772 | A * | 1/1998 | Telefus et al. | 363/21.02 |
| 5,742,151 | A | 4/1998 | Hwang | 323/222 |
| 5,747,977 | A | 5/1998 | Hwang | 323/284 |
| 5,786,687 | A | 7/1998 | Faulk | |
| 5,798,635 | A | 8/1998 | Hwang et al. | 323/222 |
| 5,804,950 | A | 9/1998 | Hwang et al. | 323/222 |
| 5,811,895 | A | 9/1998 | Suzuki et al. | 307/125 |
| 5,818,207 | A | 10/1998 | Hwang | 323/288 |
| 5,870,294 | A | 2/1999 | Cyr | 363/41 |
| 5,894,243 | A | 4/1999 | Hwang | 327/540 |
| 5,903,138 | A | 5/1999 | Hwang et al. | 323/266 |
| 5,905,369 | A | 5/1999 | Ishii et al. | 323/272 |
| 5,920,466 | A | 7/1999 | Hirahara | |
| 5,923,543 | A | 7/1999 | Choi | 363/21 |
| 6,058,026 | A | 5/2000 | Rozman | |
| 6,069,803 | A | 5/2000 | Cross | 363/21 |
| 6,091,233 | A | 7/2000 | Hwang et al. | 232/222 |
| 6,091,611 | A | 7/2000 | Lanni | |
| 6,160,725 | A | 12/2000 | Jansen | 363/65 |
| 6,272,015 | B1 | 8/2001 | Mangtani | 361/707 |
| 6,282,092 | B1 | 8/2001 | Okamoto et al. | 361/704 |
| 6,323,627 | B1 | 11/2001 | Schmiederer et al. | |
| 6,326,740 | B1 | 12/2001 | Chang et al. | |
| 6,341,075 | B2 | 1/2002 | Yasumura | |
| 6,344,980 | B1 | 2/2002 | Hwang et al. | 363/21.01 |
| 6,366,483 | B1 | 4/2002 | Ma et al. | |
| 6,396,277 | B1 | 5/2002 | Fong et al. | 324/402 |
| 6,407,514 | B1 | 6/2002 | Glaser et al. | 315/247 |
| 6,469,914 | B1 | 10/2002 | Hwang et al. | 363/210.1 |
| 6,469,980 | B1 | 10/2002 | Takemura et al. | 369/275.3 |
| 6,483,281 | B2 | 11/2002 | Hwang | 323/299 |
| 6,487,095 | B1 | 11/2002 | Malik et al. | |
| 6,531,854 | B2 | 3/2003 | Hwang | 323/285 |
| 6,541,944 | B2 | 4/2003 | Hwang | 323/225 |
| 6,583,999 | B1 | 6/2003 | Spindler et al. | |
| 6,605,930 | B2 | 8/2003 | Hwang | 323/225 |
| 6,624,729 | B2 | 9/2003 | Wright et al. | |
| 6,657,417 | B1 | 12/2003 | Hwang | 323/222 |
| 6,671,189 | B2 | 12/2003 | Jansen et al. | 363/21.14 |
| 6,674,272 | B2 | 1/2004 | Hwang | 323/284 |
| 6,831,846 | B2 | 12/2004 | Yasumura | |
| 6,894,461 | B1 * | 5/2005 | Hack et al. | 323/205 |
| 6,958,920 | B2 | 10/2005 | Mednik et al. | 363/19 |
| 6,970,366 | B2 | 11/2005 | Apeland et al. | |
| 7,035,126 | B1 | 4/2006 | Lanni | |
| 7,038,406 | B2 * | 5/2006 | Wilson | 318/140 |
| 7,047,059 | B2 | 5/2006 | Avrin et al. | 600/409 |
| 7,064,497 | B1 | 6/2006 | Hsieh | |
| 7,102,251 | B2 * | 9/2006 | West | 307/64 |
| 7,167,384 | B2 | 1/2007 | Yasumura | |
| 7,212,420 | B2 | 5/2007 | Liao | |
| 7,286,374 | B2 | 10/2007 | Yasumura | |
| 7,286,376 | B2 | 10/2007 | Yang | |
| 7,301,785 | B2 | 11/2007 | Yasumura | |
| 7,324,354 | B2 | 1/2008 | Joshi et al. | |
| 7,339,801 | B2 | 3/2008 | Yasumura | |
| 7,388,762 | B2 | 6/2008 | Yasumura | |
| 7,423,887 | B2 | 9/2008 | Yasumura | |
| 7,450,388 | B2 | 11/2008 | Beihoff et al. | |
| 7,499,301 | B2 | 3/2009 | Zhou | |
| 7,570,497 | B2 | 8/2009 | Jacques et al. | |
| 7,583,513 | B2 | 9/2009 | Boggs et al. | |
| 7,639,520 | B1 | 12/2009 | Zansky et al. | |
| 7,764,515 | B2 | 7/2010 | Jansen et al. | |
| 2002/0011823 | A1 | 1/2002 | Lee | 320/137 |
| 2003/0035303 | A1 | 2/2003 | Balakrishnan et al. | 363/16 |
| 2004/0016117 | A1 | 1/2004 | Wyrzykowska et al. | |
| 2004/0037050 | A1 | 2/2004 | Nakayama et al. | |
| 2004/0040744 | A1 | 3/2004 | Wyrzykowska et al. | |
| 2004/0066662 | A1 | 4/2004 | Park | |
| 2004/0072467 | A1 | 4/2004 | Jordan et al. | |
| 2004/0150970 | A1 | 8/2004 | Lee | |
| 2004/0183510 | A1 * | 9/2004 | Sutardja et al. | 323/266 |
| 2004/0228153 | A1 | 11/2004 | Cao et al. | 363/71 |
| 2005/0029013 | A1 | 2/2005 | Lee | |
| 2005/0041976 | A1 | 2/2005 | Sun et al. | |
| 2005/0063166 | A1 | 3/2005 | Boggs et al. | |
| 2005/0105224 | A1 | 5/2005 | Nishi | 361/18 |
| 2005/0194942 | A1 * | 9/2005 | Hack et al. | 323/205 |
| 2005/0281425 | A1 | 12/2005 | Greuet et al. | 381/331 |
| 2006/0176719 | A1 | 8/2006 | Uruno et al. | |
| 2006/0284697 | A1 | 12/2006 | Lin et al. | |
| 2007/0007933 | A1 | 1/2007 | Chan et al. | |
| 2007/0192559 | A1 | 8/2007 | Betsui et al. | |
| 2007/0236967 | A1 | 10/2007 | Liu et al. | |
| 2008/0245556 | A1 | 10/2008 | Bird et al. | |
| 2008/0245557 | A1 | 10/2008 | Bird et al. | |
| 2008/0250373 | A1 | 10/2008 | Bird et al. | |
| 2008/0250377 | A1 | 10/2008 | Bird et al. | |
| 2009/0014206 | A1 | 1/2009 | Motohashi et al. | |
| 2009/0015345 | A1 | 1/2009 | Kushta et al. | |
| 2009/0224785 | A1 | 9/2009 | Breinlinger et al. | |
| 2009/0231887 | A1 | 9/2009 | Ye et al. | |
| 2009/0290384 | A1 | 11/2009 | Jungreis | |
| 2009/0290385 | A1 | 11/2009 | Jungreis et al. | |

OTHER PUBLICATIONS

EE Times.com—"Team Claims Midrange Wireless Energy Transfer", by R. Colin Johnson, 4 pages, Nov. 6, 2007.

EE Times.com—"Wireless Bacon Could Recharge Consumer Devices", by R. Colin Johnson, 3 pages, Nov. 6, 2007.

The Notification of Transmittal of the International Search Report and the Written Opinion of the International Searching Authority, or the Declaration; International Application No. PCT/US2009/065300, International Filing Date Nov. 20, 2009, Authorized Officer Blaine R. Copenheaver, 11 pages.

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

Scollo, P. Fichera R., "Electronic Transformer for a 12V Halogen Lamp", Jan. 1999, ST Microelectronics pp. 1-4.

Notice of Allowance dated Sep. 17, 2010, U.S. Appl. No. 12/079,662, filed Mar. 27, 2008, 27 pages.

* cited by examiner

BI-DIRECTIONAL REGULATOR FOR REGULATING POWER

RELATED APPLICATIONS

This application claims benefit of priority to U.S. Provisional Patent Application, Ser. No. 60/847,350 filed Sep. 25, 2006, and entitled "BI-DI REGULATOR," which is incorporated herein in its entirety by reference.

FIELD OF THE INVENTION

The present invention relates to the field of power supplies. More particularly, the present invention relates to integrated circuit regulators used with power supply apparatus.

BACKGROUND

In many applications a voltage regulator is required to provide a voltage within a predetermined range. Some circuits are subject to uncertain and undesirable functioning and even irreparable damage if an input power supply fall outside a certain range.

A prior art regulated power supply 600 is shown in FIG. 6. An input power converting circuit can include an AC generator 604 and a rectifier 607 coupled across an input Vin, a capacitor 605 also coupled across input Vin and coupled with a primary of transformer 610, a switch 608 coupled with the primary of the transformer 610 at a drain of the switch 608, and a pulse width modulator (PWM) module 606 coupled with a gate of the switch 608. The input power converting circuit can also include a rectifying diode 620 and capacitor 618 coupled across a secondary of the transformer 610. The power supply 600 can include a voltage regulating circuit including optical coupler circuit 612 and zener diode 622. The power supply 600 using the PWM module 606 to alter a duty cycle of the switch 608. The optical coupler circuit 612 in cooperation with zener diode 622 provides feedback to the PWM module 606. The PWM module 606 accordingly adjust the duty cycle of the switch 608 to compensate for any variances in an output voltage Vout of a load 623. A capacitor C1 also provides a substantial filtering to the power supply 600. However, the size of the capacitor C1 required for this type of power supply is prohibitively large.

Accordingly, it is desirable to create a regulated power supply to greatly reduce the size of the filter capacitor C1.

SUMMARY OF THE INVENTION

The present invention is for power sharing, voltage sharing regulation. A bi-directional block is a fractional power regulator coupled in parallel to the load. A power storage device is selectively used to store energy as the sensed voltage exceeds a threshold and supply energy as the sensed voltage falls below the threshold. These techniques provide a more efficient circuit then previously available. Additionally, the invention reduces the complexity of a traditional closed loop system.

In accordance with a first aspect of the present invention, a regulated power supply apparatus is provided. The apparatus includes an input power converting circuit for generating a rectified voltage signal. An output power converting circuit includes a plurality of switching elements. The output power converting circuit is coupled to receive the rectified voltage signal. An output power storing element is coupled with the output power converting circuit. An output power bidirectional regulating circuit includes an integrated circuit coupled with the output power converting circuit. The bidirectional regulating circuit includes control signals for operating the switching elements to store power on the output power storing element and to deliver power to an output load from the output power storing element.

In accordance with a second aspect of the present invention, a method of regulating a power supply apparatus is provided. The method includes sampling a voltage applied to a load with an output power bidirectional regulating circuit. The regulating circuit includes control signals coupled to a plurality of switching elements for operating the switching elements selectively as boost and buck converters of the apparatus for supplying power. The voltage with sensed with the bidirectional regulating circuit. Power is stored in a power storing element when the voltage applied to the load exceeds a threshold. A compensating power is supplied to the load when the voltage applied to the load is less then the threshold.

In accordance with another aspect of the present invention, a bidirectional power regulating circuit is provided. The circuit includes an input for receiving a rectified signal. An inductive element is coupled with the input. A drain of a first switching element is couple with the inductive element and a drain of a second switching element coupled with the inductive element. An integrated circuit regulator, including a first control signal is coupled with a gate of the first switching element and second control signal is coupled with a gate of the second switching element, for controlling the first and the second switching elements.

Other features of the present invention will become apparent from consideration of the following description taken in conjunction with the accompanying drawings.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
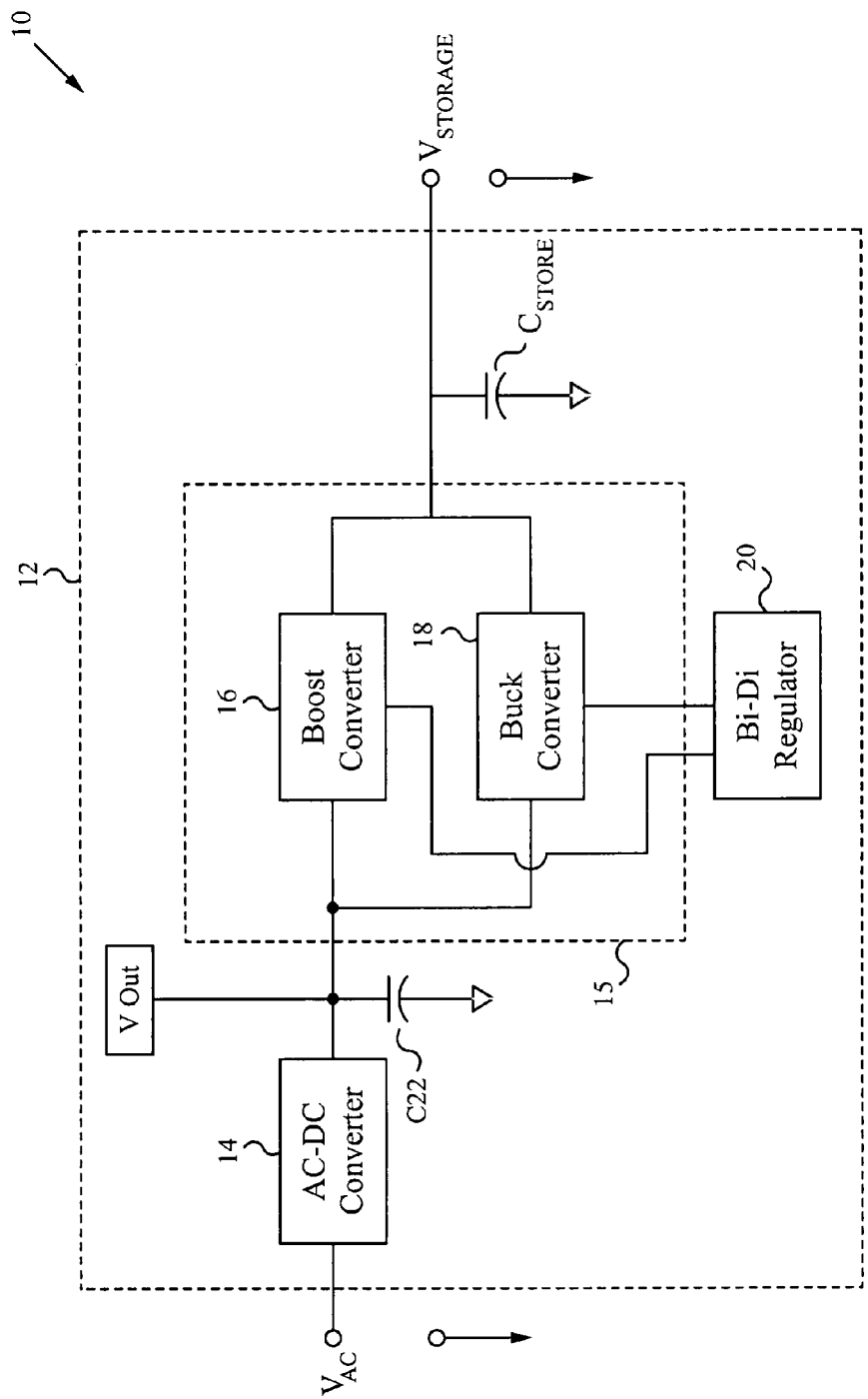
FIG. 1 illustrates a functional block diagram of an apparatus for regulating a voltage of a power supply in accordance with an embodiment of the invention.

Turning to FIG. 1, a functional block diagram is shown for a regulated power supply apparatus 10 according to the present invention. The apparatus 10 generally includes an input power converting circuit 14 also known an AC to DC converter coupled with an output power converting circuit 15 selectively comprising a boost converter 16 and a buck converter 18. An output power bidirectional regulating circuit or Bi-Di regulator 20 is coupled to selectively control the boost converter 16 and the buck converter 18. An output power storing circuit 22 such as a capacitor is coupled with the boost converter 16 and the buck converter 18. The AC to DC converter 14 is coupled with the boost converter 16 and the buck converter 18 via an insulation device, for example a transformer.

The AC to DC converter 14 is coupled to receive an alternating current Vac and to generate an unregulated direct current coupled as an input of the power converting circuit 15. Typically, the Bi-Di regulator 20 selectively operates the boost converter 16 and the buck converter 18 to maintain a constant output voltage Vout. The Bi-Di regulator 20 senses a power drop and power increase in Vout and controls a supply of a compensating power to correct the power increase or power drop in Vout. The Bi-Di regulator 20 can prevent the voltage Vout from exceeding a threshold by operating the boost converter 16 to transfer excess power from a load to the power storing circuit 22. Conversely, the Bi-Di regulator 20 can prevent the voltage Vout from falling below a threshold by operating the buck converter 20 to transfer excess power from the power storing circuit 22 to the load.

Figure 2:
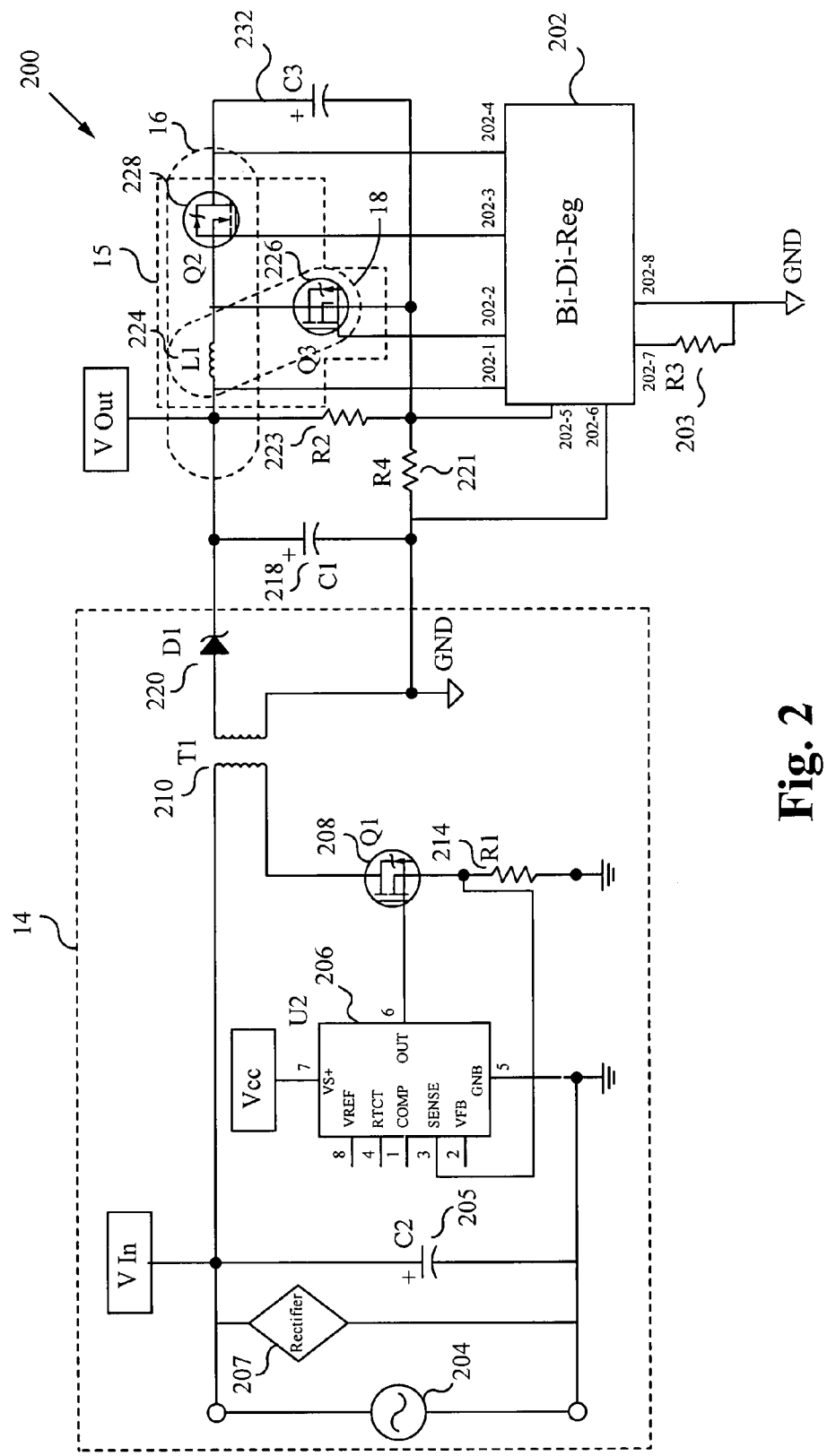
FIG. 2 illustrates a schematic diagram of an apparatus for regulating a voltage of a power supply in accordance with an embodiment of the invention.

Turning to FIG. 2, a schematic diagram is shown for a regulated power supply apparatus 200 according to the present invention. The apparatus 200 generally includes an input power converting circuit 14 for generating an unregulated voltage signal. An output power converting circuit 15 is coupled with the input power converting circuit 14 to receive the unregulated voltage signal. An output power storing element 232 is coupled with the output power converting circuit 15. An output power bidirectional regulating circuit or Bi-Di regulator 202 coupled to control the output power converting circuit 15.

The input power converting circuit 14 can comprise an AC generator 204 and a rectifier 207 coupled across an input Vin. A capacitor 205 is also coupled across input Vin and coupled with a primary of a transformer 210. A switch 208 is coupled with the primary of the transformer 210 at a source of the switch 208, and a pulse width modulator (PWM) module 206 coupled with a gate of the switch 208. The input power converting circuit 14 can also include a rectifying diode 220. In some applications the filter capacitor 218 can be very small or eliminated.

The output power converting circuit 15 comprises an inductor 224 coupled to receive the output signal from the AC to DC converter 14 and to an output Vout. A first switching element 226 is coupled with the inductor 224 at a drain of the first switching element 226. A second switching element 228 is coupled with the inductor 224 at a drain of the second switching element 228. A load 223 is coupled across output Vout. The output power storing circuit 232 preferably comprises a capacitor. The boost converter 16 is formed by controlling the second switching element 228 to operate as a diode and controlling the first switching element 226 to operate as a switch to store power on the inductor 224 and capacitor 232. The buck converter 18 is formed by controlling the first switching element 226 to operate as a diode, the second switching element 226 to operate as a switch, and the inductor 224 to deliver power to the load 223 from the capacitor 232.

The Bi-Di regulator 202 can comprise control signals 202-1 to 202-8. The control signals 202-1 to 202-8 provide an enablement signal and a timing signal for controlling the first and the second switching elements 226, 228. Control signal 202-1 is coupled with output Vout. Control signal 202-2 is coupled with a gate of the first switching element 226. Control signal 202-3 is coupled with a gate of the second switching element 228. Control signal 202-4 is coupled with a source of the second switching element 228 and capacitor 232.

The control signal 202-2 can enable a switching function of the first switching element 226, whereas the control signal 202-3 can enable a switching function of the second switching element 228. The first and second switching element 226, 228 can also function as a diode. The diode function of the first and second switching elements 226, 228 is enabled when the first and second switching elements 226, 228 have the gate to source voltage set to 0V and the source voltage greater than the drain voltage. The control signal 202-1 is used to sense an applied voltage at the output Vout. A threshold or reference voltage Vref can be generated with a voltage divider within the Bi-Di regulator.

The AC generator 204 provides an alternating voltage to the rectifier 207, which generates the DC input Vin. The module 206 with the switch 208 chops the voltage Vin into a high frequency input to the transformer 210. The output of the transformer 210 is rectified by the rectifying diode 220 and filtered by the capacitor 218 to provide an unregulated rectified direct current to the load 223. The Bi-Di regulator 202 senses the voltage Vout applied to the load 223. The applied voltage Vout can be sensed using the control signal 202-1. The applied voltage Vout is compared with the reference voltage Vref to determine to within a predetermined range if the applied voltage Vout exceeds the reference voltage Vref or is less than the reference voltage. If the applied voltage Vout exceeds the reference voltage Vref the boost converter 16 is enabled. The control signal 202-2 is used to enable the switching function of the first switching element 226. The control signal 202-3 is used to control the second switching element 228 to operate as a diode. The boost converter 16 is operated to transfer excess power from the applied voltage Vout and store the excess power into the power storing element 232. The boost converter 16 is enabled until the applied voltage Vout is returned within a predetermined range of the reference voltage Vref.

If the applied voltage Vout is less than the reference voltage Vref the buck converter 16 is enabled. The control signal 202-3 is used to enable the switching function of the second switching element 228. The control signal 202-2 is used to control the first switching element 226 to operate as a diode. The buck converter 18 is operated to transfer a compensating power from the power storing element 232 to the load 223. The buck converter 18 is enabled until the applied voltage Vout is returned within a predetermined range of the reference voltage Vref.

Figure 3:
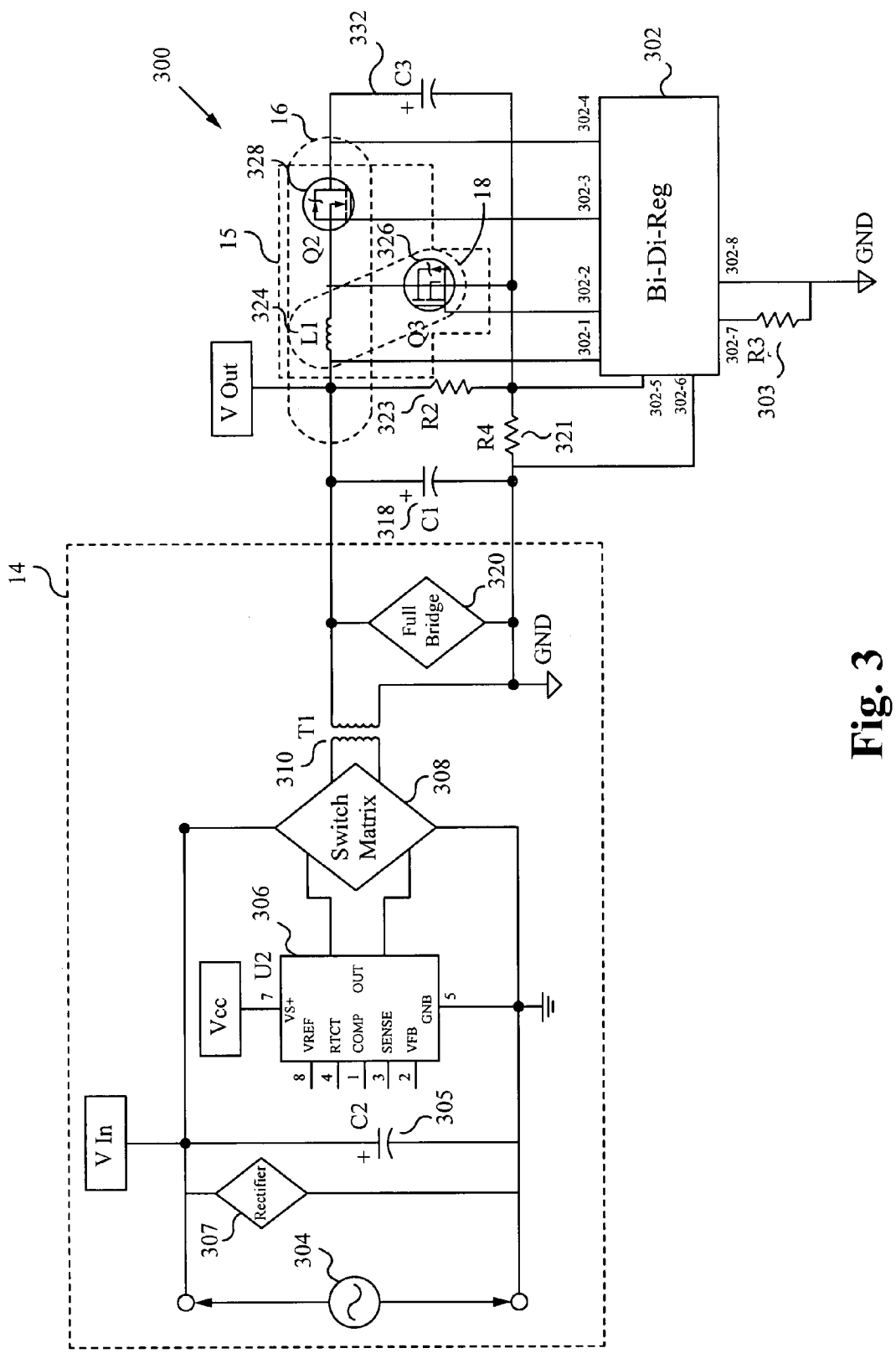
FIG. 3 illustrates a schematic diagram of an apparatus for regulating a voltage of a power supply in accordance with an alternative embodiment of the invention.

Turning to FIG. 3, a schematic diagram of an alternative embodiment is shown for a regulated power supply apparatus 300 according to the present invention. The apparatus 300 generally includes an input power converting circuit 14 for generating an unregulated voltage signal. An output power converting circuit 15 is coupled with the input power converting circuit 14 to receive the unregulated voltage signal. An output power storing element 332 is coupled with the output power converting circuit 15. An output power bidirectional regulating circuit or Bi-Di regulator 302 coupled to control the output power converting circuit 15.

The input power converting circuit 14 can comprise an AC generator 304 and a rectifier 307 coupled across an input Vin. A capacitor 305 is also coupled across input Vin and coupled with a primary of a transformer 310. A two matrix or four matrix switch 308 coupled with the primary of the transformer 310, and a pulse width modulator (PWM) module 306 coupled with switch 308. The input power converting circuit 14 can also include a full wave bridge 320. In some applications the filter capacitor 318 can be very small or eliminated.

The output power converting circuit 15 comprises an inductor 324 coupled to receive the output signal from the AC to DC converter 14 and to an output Vout. A first switching element 326 is coupled with the inductor 324 at a drain of the first switching element 326. A second switching element 328 is coupled with the inductor 324 at a drain of the second switching element 328. A load 323 is coupled across output Vout. The output power storing circuit 332 preferably comprises a capacitor. The boost converter 16 is formed by controlling the second switching element 328 to operate as a diode and controlling the first switching element 326 to operate as a switch to store power on the inductor 324 and capacitor 332. The buck converter 18 is formed by controlling the first switching element 326 to operate as a diode, the second switching element 326 to operate as a switch, and the inductor 324 to deliver power to the load 323 from the capacitor 332.

The Bi-Di regulator 302 can comprise control signals 302-1 to 302-8. The control signals 302-1 to 302-8 provide an enablement signal and a timing signal for controlling the first and the second switching elements 326, 328. Control signal 302-1 is coupled with output Vout. Control signal 302-2 is coupled with a gate of the first switching element 326. Control signal 302-3 is coupled with a gate of the second switching element 328. Control signal 302-4 is coupled with a source of the second switching element 328 and capacitor 332.

The control signal 302-2 can enable a switching function of the first switching element 326, whereas the control signal 302-3 can enable a switching function of the second switching element 328. The first and second switching element 326, 328 can also function as a diode. The diode function of the first and second switching elements 326, 328 is enabled when the first and second switching elements 326, 328 have the gate to source voltage set to 0V and the source voltage greater than the drain voltage. The control signal 302-1 is used to sense an applied voltage at the output Vout. A threshold or reference voltage Vref can be generated with a voltage divider within the Bi-Di regulator.

The AC generator 304 provides an alternating voltage to the rectifier 307, which generates the DC input Vin. The module 306 with the two matrix or four matrix switch 308, chops the voltage Vin into a high frequency input to the transformer 310. The output of the transformer 310 is rectified by the full wave bridge 320 and filtered by the capacitor 318 to provide an unregulated rectified direct current to the load 323. The Bi-Di regulator 302 senses the voltage Vout applied to the load 323. The applied voltage Vout can be sensed using the control signal 302-1. The applied voltage Vout is compared with the reference voltage Vref to determine to within a predetermined range if the applied voltage Vout exceeds the reference voltage Vref or is less than the reference voltage. If the applied voltage Vout exceeds the reference voltage Vref the boost converter 16 is enabled. The control signal 302-2 is used to enable the switching function of the first switching element 326. The control signal 302-3 is used to control the second switching element 328 to operate as a diode. The boost converter 16 is operated to transfer excess power from the applied voltage Vout and store the excess power into the power storing element 332. The boost converter 16 is enabled until the applied voltage Vout is returned within a predetermined range of the reference voltage Vref.

If the applied voltage Vout is less than the reference voltage Vref the buck converter 16 is enabled. The control signal 302-3 is used to enable the switching function of the second switching element 328. The control signal 302-2 is used to control the first switching element 326 to operate as a diode. The buck converter 18 is operated to transfer a compensating power from the power storing element 332 to the load 323. The buck converter 18 is enabled until the applied voltage Vout is returned within a predetermined range of the reference voltage Vref.

Figure 4:
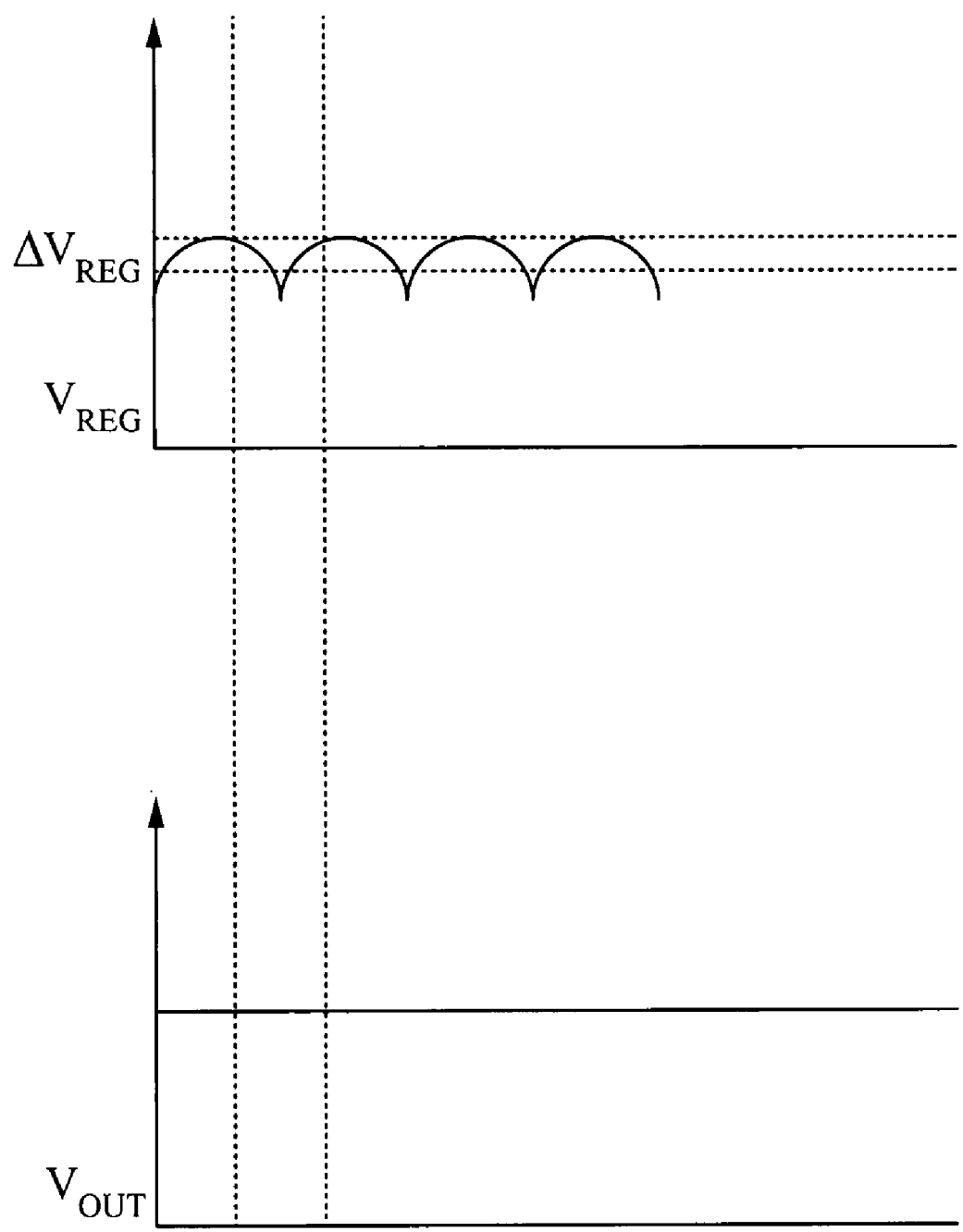
FIG. 4 illustrates a waveform diagram of a regulated voltage Vreg and output Vout in accordance with the present invention.

Turning now to FIG. 4, a waveform diagram is shown of a regulated voltage Vreg and an output Vout in accordance with the present invention. The Bi-Di regulator 202 (FIG. 2) operates the boost converter 16 and the buck converter 18 to smooth and reduce voltage ripples sensed at the output Vout. The Bi-Di regulator 202 monitors or senses output voltage Vout and compares with the regulated voltage Vreg. The boost converter 16 and the buck converter 18 are enabled until the output voltage Vout returns to within a predetermined voltage range $\Delta$Vreg. A resulting smooth and regulated voltage Vout is shown.

Figure 5:
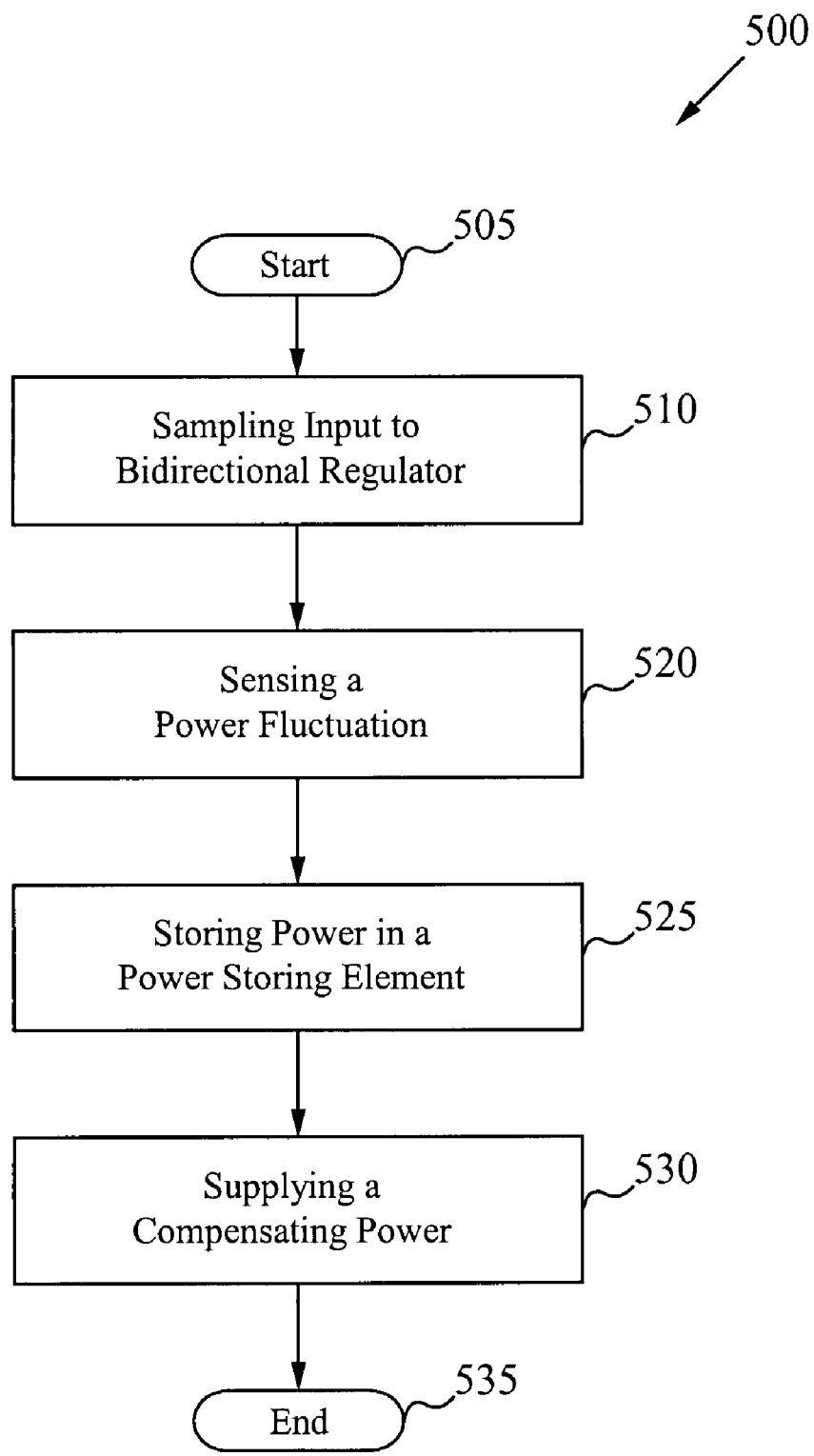
FIG. 5 illustrates a process flow diagram for a method of regulating a power supply apparatus in accordance with the present invention.
Figure 6:
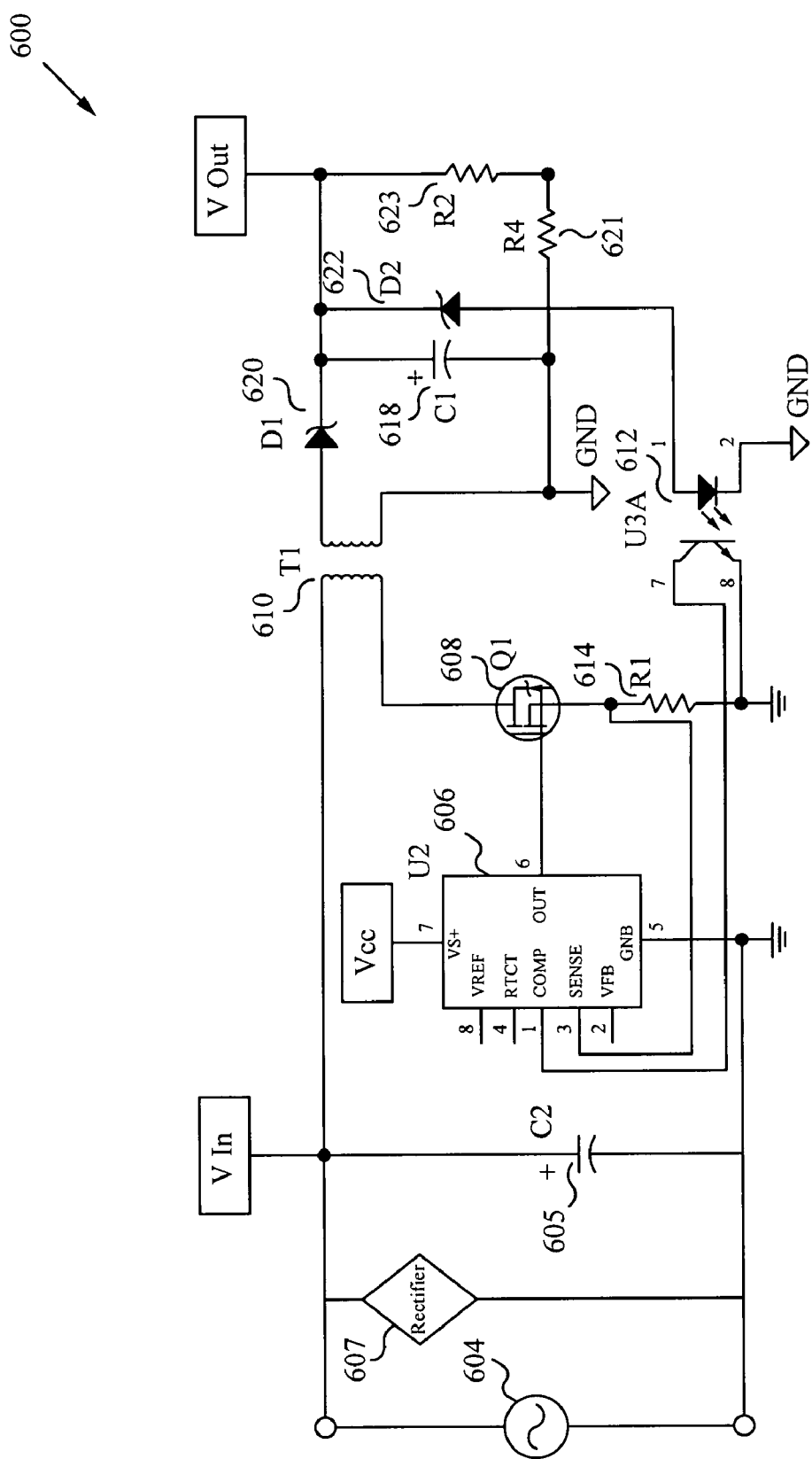
FIG. 6 illustrates prior art power regulating circuit.

Turning to FIG. 5, a process flow diagram 500 is shown for a method of regulating a power supply apparatus in accordance with the present invention. The process begins at the step 505. At the step 510, the Bi-Di regulator 202 senses the voltage Vout applied to the load 223. The applied voltage Vout can be sensed using the control signal 202-1. At the step 520, the applied voltage Vout is compared with the reference voltage Vref to determine to within a predetermined range if the applied voltage Vout exceeds the reference voltage Vref or is less than the reference voltage. At the step 525, the Bi-Di regulator 202 can store power in the power storing element 232. If the applied voltage Vout exceeds the reference voltage Vref the boost converter 16 is enabled. The control signal 202-2 is used to enable the switching function of the first switching element 226. The control signal 202-3 is used to control the second switching element 228 to operate as a diode. The boost converter 16 is operated to transfer excess power from the applied voltage Vout and store the excess power into the power storing element 232. The boost converter 16 is enabled until the applied voltage Vout is returned within a predetermined range of the reference voltage Vref.

At the step 530, the Bi-Di regulator 202 can supply a compensating power the load 223. If the applied voltage Vout is less than the reference voltage Vref the buck converter 16 is enabled. The control signal 202-3 is used to enable the switching function of the second switching element 228. The control signal 202-2 is used to control the first switching element 226 to operate as a diode. The buck converter 18 is operated to transfer a compensating power from the power storing element 232 to the load 223. The buck converter 18 is enabled until the applied voltage Vout is returned within a predetermined range of the reference voltage Vref.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A regulated power supply apparatus comprising:
    an input power converting circuit for generating a rectified voltage signal;
    an output power converting circuit comprising a plurality of switching elements, the output power converting circuit coupled to receive the rectified voltage signal;

an output power storing element coupled with the output power converting circuit; and an output power bidirectional regulating circuit comprising an integrated circuit coupled with the output power converting circuit, the bidirectional regulating circuit including control signals for operating the switching elements to store power on the output power storing element when a voltage applied to the load exceeds a threshold; and to supply a compensating power to an output load from the power storing element when the voltage applied to the load is less then the threshold, wherein the bidirectional regulating circuit is configured to:

compare a reference voltage with the applied voltage;

configure the plurality of switching elements as a boost converter when the applied voltage is greater than the reference voltage, wherein the applied voltage is reduced by transferring excess power from the applied voltage to the output power storing element; and configure the plurality of switching elements as a buck converter when the applied voltage is less than the reference voltage, wherein the applied voltage is increased by transferring excess power from the output power storing element to the applied voltage.

2. The apparatus of claim 1, wherein a first switching element and a second switching element are configured such that the first switching element functions as a transistor and the second switching element functions as a diode, wherein the functions of the first and second switching element are alternately switched with each other by the bidirectional regulating circuit.

3. The apparatus of claim 1, further comprising a reference input on the bidirectional regulating circuit for generating a reference voltage for the output load.

4. The apparatus of claim 1, further comprising a sensing input on the bidirectional regulating circuit for measuring a voltage of the output load.

5. The apparatus of claim 1, wherein the output power storing element comprises a capacitor element.

6. The apparatus of claim 1, wherein the switching elements each comprise a semiconductor device.

7. The apparatus of claim 1, wherein the output power converting circuit includes an inductive element coupled with the switching elements.

8. The apparatus of claim 1, wherein the input power converting circuit is configured to convert an alternating current to a direct current.

9. The apparatus of claim 1, wherein a first switching element is an open circuit and a second switching element is a closed circuit such that excess power is stored in the output power storage element when the voltage applied to the load exceeds a threshold.

10. The apparatus of claim 1, wherein a first switching element is a closed circuit and a second switching element is an open circuit such that power stored in the output power storage element is delivered to the output when the voltage applied to the load is less then the threshold.

11. The apparatus of claim 1 further comprising a comparator for comparing the voltage applied to the output load to a reference voltage.

12. The apparatus of claim 11 wherein the bidirectional regulator is configured to generate the reference voltage.

13. The apparatus of claim 11 wherein the first switch and second switch are arranged as a boost converter when the voltage applied is greater than the reference voltage.

14. The apparatus of claim 11 wherein the first switch and second switch are arranged as a buck converter when the voltage applied is less than the reference voltage.

15. A method of regulating a power supply apparatus comprising:

sampling a voltage applied to a load with an output power bidirectional regulating circuit, the regulating circuit including control signals coupled to a plurality of switching elements for operating the switching elements selectively as boost and buck converters of the apparatus for supplying power;

sensing the voltage with the bidirectional regulating circuit; and regulating the voltage to be in a predetermined range including:

storing power in a power storing element when the voltage applied to the load exceeds a threshold; and supplying a compensating power to the load when the voltage applied to the load is less then the threshold;

generating a reference voltage from a reference input of the bidirectional regulating circuit, comparing the reference voltage with the applied voltage;

configuring the plurality of switches as the boost converter when the sampled applied voltage is greater than the reference voltage, wherein the applied voltage is reduced by transferring excess power from the applied voltage to the power storing element; and configuring the plurality of switches as the buck converter when the sampled applied voltage is less than the reference voltage, wherein the applied voltage is increased by transferring excess power from the power storing element to the applied voltage.

16. The method of claim 15, wherein a first switching element and a second switching element are configured such that the first switching element functions as a transistor and the second switching element functions as a diode, wherein the functions of the first and second switching element are alternately switched with each other by the control signals.

17. The method of claim 15, wherein the output power bidirectional regulating circuit comprises an integrated circuit coupled with an output power converting circuit.

18. The method of claim 15, wherein the applied voltage to the load is sampled using a sensing input of the bidirectional regulating circuit.

19. The method of claim 15, further comprising generating the control signals to configure a first switching element and a second switching element such that the first switching element functions as a transistor and the second switching element functions as a diode, wherein the functions of the first and second switching element are alternately switched with each other based on a difference between the reference voltage and the applied voltage.

20. The method of claim 15, further comprising an inductive element coupled with the plurality of switching elements.

21. The apparatus of claim 15, wherein the power storing element comprises a capacitor element.

22. The apparatus of claim 15, wherein the switching elements each comprise a semiconductor device.

23. The apparatus of claim 15, wherein the input power converting circuit is configured to convert an alternating current to a direct current.

24. A method of regulating a power supply apparatus comprising:

sampling a voltage applied to a load with an output power bidirectional regulating circuit, the regulating circuit including control signals coupled to a plurality of switching elements for operating the switching elements selectively as boost and buck converters of the apparatus for supplying power;

sensing the voltage with the bidirectional regulating circuit; and regulating the voltage to be in a predetermined range including:

generating a reference voltage from a reference input of the bidirectional regulating circuit;

comparing the reference voltage with the applied voltage, wherein a first and a second switch are configured as the boost converter when the voltage is greater than the reference voltage;

storing power in a power storing element when the voltage applied to the load exceeds a threshold; and supplying a compensating power to the load when the voltage applied to the load is less then the threshold.

\* \* \* \* \*

UNITED STATES PATENT AND TRADEMARK OFFICE
CERTIFICATE OF CORRECTION

| | | |
|---|---|---|
| PATENT NO. | : 8,223,522 B2 | |
| APPLICATION NO. | : 11/904180 | |
| DATED | : July 17, 2012 | |
| INVENTOR(S) | : Mark D. Telefus | |

It is certified that error appears in the above-identified patent and that said Letters Patent is hereby corrected as shown below:

<u>IN THE COVER SHEET</u>

In the Cover Sheet, field (75) Inventor, please delete the name "Telfus" and insert the name -- Telefus -- so that the Inventor name field correctly reads:

-- (75) Inventor: Mark D. Telefus Orinda, CA (US) --

Signed and Sealed this
Eleventh Day of September, 2012

David J. Kappos
*Director of the United States Patent and Trademark Office*